United States Patent
Sharma et al.

(10) Patent No.: US 9,686,099 B2
(45) Date of Patent: Jun. 20, 2017

(54) UPDATING VIRTUAL NETWORK MAPS

(75) Inventors: Puneet Sharma, Palo Alto, CA (US); Tianxiong Ji, Mountain View, CA (US); Zhikui Wang, Fremont, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 891 days.

(21) Appl. No.: 13/458,137

(22) Filed: Apr. 27, 2012

(65) Prior Publication Data
US 2013/0287032 A1    Oct. 31, 2013

(51) Int. Cl.
| H04L 12/56 | (2006.01) |
| H04L 12/28 | (2006.01) |
| H04L 12/24 | (2006.01) |
| H04L 12/46 | (2006.01) |

(52) U.S. Cl.
CPC ........ H04L 12/462 (2013.01); H04L 12/4641 (2013.01)

(58) Field of Classification Search
USPC .................................................. 370/235, 237
See application file for complete search history.

(56) References Cited

U.S. PATENT DOCUMENTS

| 7,693,158 | B1 | 4/2010 | Carrie |
| 2009/0010265 | A1 | 1/2009 | Vishnubhotla et al. |
| 2009/0274044 | A1 | 11/2009 | Goose et al. |
| 2012/0207026 | A1* | 8/2012 | Sato .............................. 370/237 |
| 2013/0155862 | A1* | 6/2013 | Tanaka et al. ................ 370/235 |

FOREIGN PATENT DOCUMENTS

| CN | 1411213 | 4/2003 |
| CN | 101247310 | 8/2008 |

OTHER PUBLICATIONS

Zhang, M. et al.: Adaptive VLAN Assignment for Data Center RBridges, Internet-Draft, Oct. 31, 2011 (13 pages).

* cited by examiner

*Primary Examiner* — Kevin C Harper
*Assistant Examiner* — Derrick V Rose
(74) *Attorney, Agent, or Firm* — Trop, Pruner & Hu, P.C.

(57) ABSTRACT

A switch determines a path, not included in a first set of virtual networks associated with the switch. It is determined if the path can be added to an existing virtual network in the first set of virtual networks. If the path cannot be added, a new virtual network is created to include the path.

20 Claims, 5 Drawing Sheets

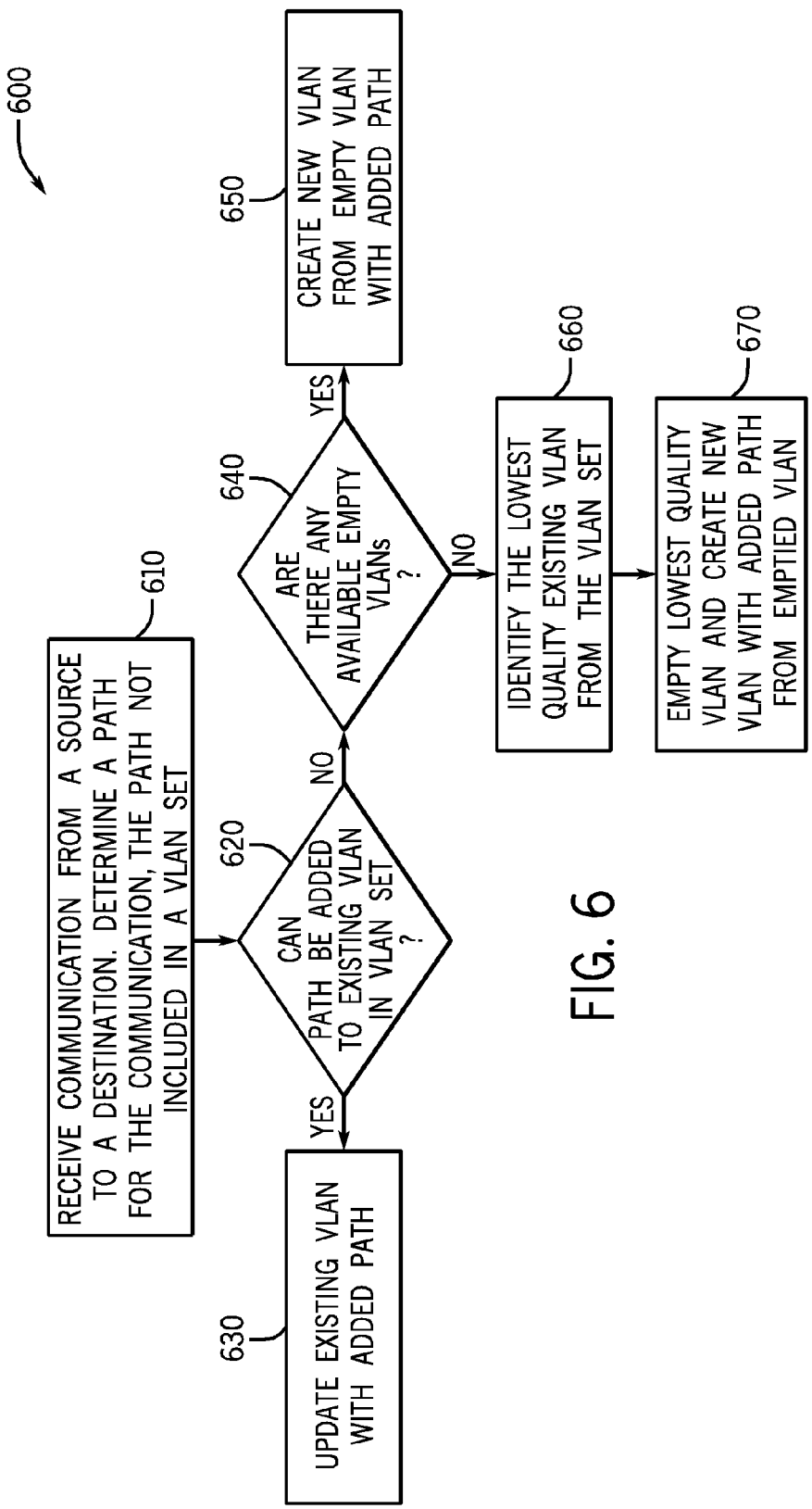

UPDATING VIRTUAL NETWORK MAPS

BACKGROUND

In network communications, multi-path routing techniques may provide for multiple alternative paths through a network from a source to a destination. To this end, the availability of such various paths can yield certain benefits such as fault tolerance, increased bandwidth, improved security, and/or the like. Example schemes such as Hash-Based Routing (HBR) and Smart Path Assignment in Networks (SPAIN) have been proposed to meet growing bandwidth demands in data center networks.

BRIEF DESCRIPTION OF THE DRAWINGS

Some embodiments are described with respect to the following figures:

FIG. 6 is a flow diagram depicting another technique for updating a VLAN map according to example implementations.

DETAILED DESCRIPTION

Figure 1:
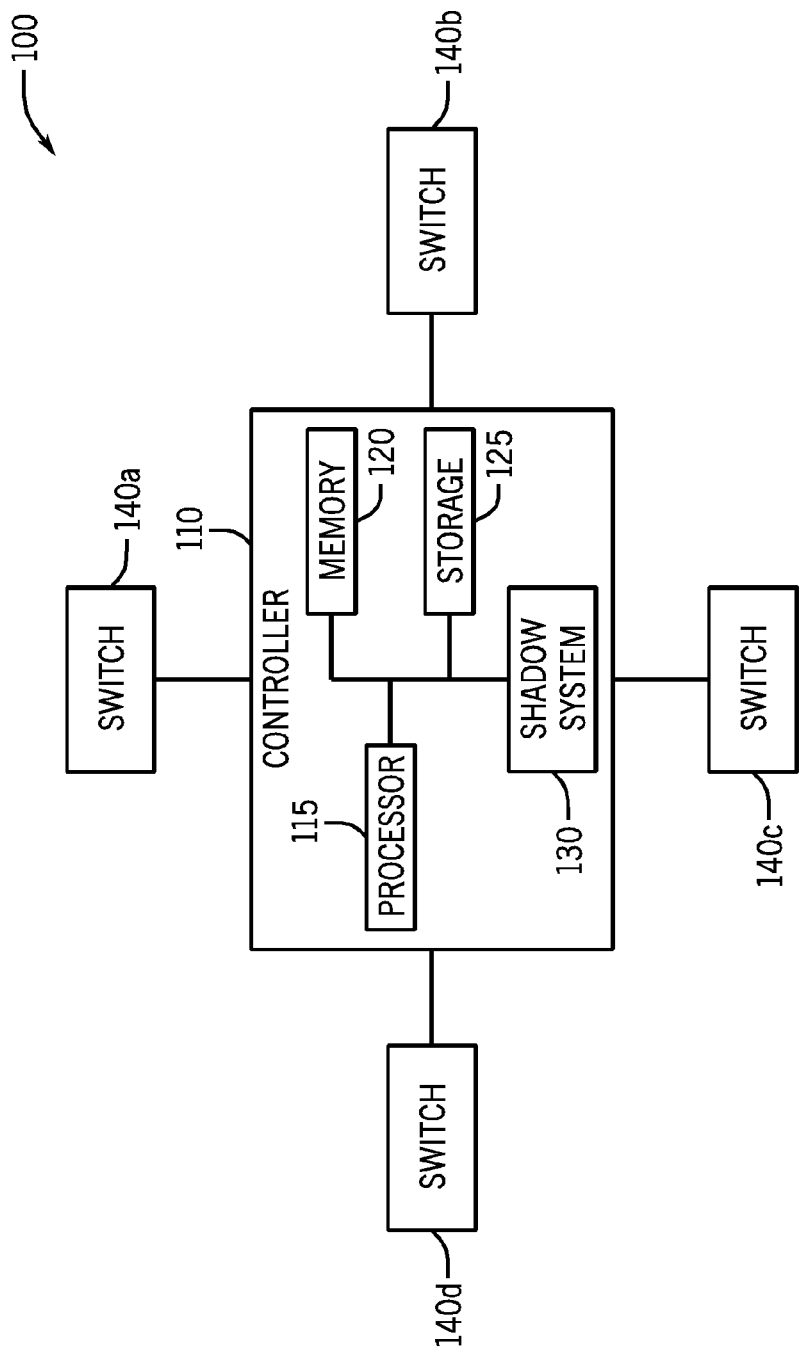
FIG. 1 is a schematic diagram of a system according to example implementations.

FIG. 1 is a schematic diagram of an example network 100 in accordance with some implementations. The network 100 may include a controller 110 in communication with multiple switches 140a-d. Network endpoints (not shown) can communicate through the switches 140a-d. Furthermore, the network 100 may be any type of network including a Local Area Network (LAN), Wide Area Network (WAN), Storage Area Network (SAN), WiFi Network, or any other wired or wireless network.

The controller 110 may include a processor 115 in communication with a memory 120 and a storage device 125. In addition, the controller 110 may also include a shadow system 130. In some implementations, the shadow system 130 may include a software program including machine-readable instructions that simulates network traffic on the network 100. As such, the shadow system 130 may be programmed to mimic the same network topology as the network 100. Using data resulting from network traffic simulations, the shadow system 130 may generate a probabilistic routing table, described in more detail with respect to FIG. 2, and send the routing table to the switches 140a-d. Moreover, while FIG. 1 depicts a shadow system 130 to simulate traffic conditions for route determination, other types of systems can be used in other implementations.

In certain implementations, the switches 140a-d may be edge switches, with each edge switch 140a-d belonging to its own associated network. In other words, each edge switch 140a-d may serve as an entry point to its respective network. As such, the edge switches 140a-d may be in communication with other switches and/or other devices in their respective networks (not shown). It should be understood that FIG. 1 can include other types of switches aside from edge switches. Furthermore, while just one controller 110 and four switches 140a-d are illustrated in FIG. 1, any number and combination of controllers and switches are also possible. Still further, while certain functionalities may be described with reference to edge switches 140a-d, it should be noted that these functionalities may also be present in end host systems as well.

Figure 2:
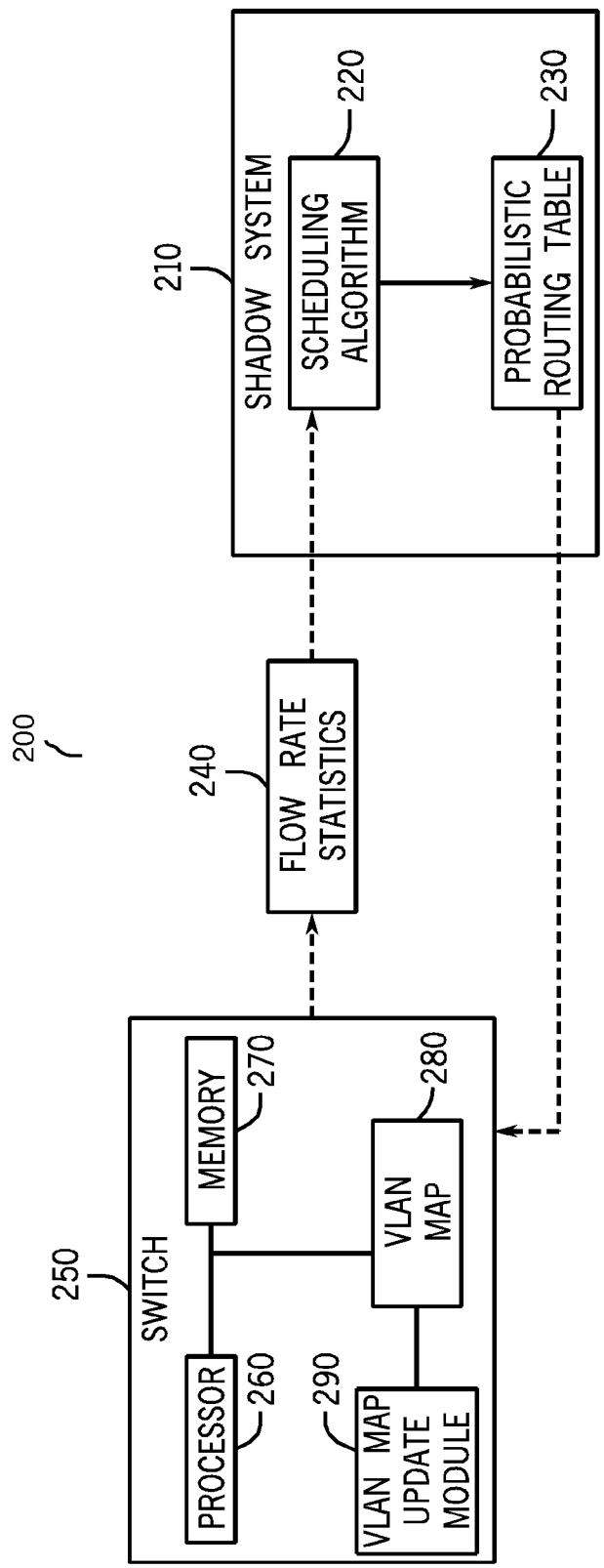
FIG. 2 is a schematic diagram of a shadow system in communication with a switch according to example implementations.

FIG. 2 illustrates example interactions between a shadow system 210 and an edge switch 250. In some implementations, the shadow system 210 may correspond to the shadow system 130 of the controller 110 in FIG. 1, and the edge switch 250 may correspond to any or all of the switches 140a-d. While just one edge switch 250 is illustrated in FIG. 2 for simplicity, other switches may also be in communication with the edge switch 250 and/or the shadow system 210. Such switches may include similar components and perform similar functions to those illustrated and described for edge switch 250.

A virtual network may be a type of computer network in which the components of the network may be virtually linked. A virtual link may be emulated, such as by machine-readable instructions, which may be in contrast to physical (wired or wireless) links. Some examples of virtual networks may include Virtual Private Networks (VPNs), Virtual Private LAN Service (VPLS), and Virtual Local Area Networks (VLANs).

VLANs may be logical LANs based on physical LANs. As such, a VLAN can include part of a LAN, can span multiple LANs, and/or can span multiple parts of multiple LANs. Therefore, VLANs may enable various network entities to be grouped together regardless of their physical location. As a result, VLANs may enable effective distribution of network traffic using different load balancing schemes. Such load balancing schemes may determine "optimal" VLAN sets on which to more efficiently distribute network traffic. For example, SPAIN and HBR systems may include algorithms for such VLAN set determination.

However, what is initially considered an optimal VLAN and/or VLAN set may change over time with respect to various criteria. Changing network traffic conditions and particular VLAN usage may be some examples of such criteria. Thus, the ability to dynamically update VLANs in a VLAN set allows for adaptation of the VLAN set to meet changing network traffic conditions or to meet other criteria.

The edge switch 250 may include a processor 260 in communication with a memory 270 and a Virtual Local Area Network (VLAN) map 280. In some instances, the VLAN map 280 may be stored in a storage device (not shown) associated with the switch 250 or alternatively, stored in memory 270. The VLAN map 280 may store relationships among different VLANs in a VLAN set. Each VLAN may represent multiple paths among different switches 250 within the network 200. As used herein, a path may refer to a hop or link or multiple hops or links between two switches 250 within the network 200. VLAN maps 280 are described in more detail below with respect to FIG. 3 and FIG. 4.

Furthermore, in some implementations, the processor 260 may execute machine-readable instructions stored in memory 270 to calculate flow rate statistics 240 of network traffic between the edge switch 250 and different destinations (not shown). For example, flow rate statistics 240 may include, among other parameters, the data throughput between edge switch 250 and other destination devices. After generating the flow rate statistics 240, the edge switch 250 may send the flow rate statistics 240 to the shadow system 210.

At the shadow system 210, a scheduler 220 may receive the flow rate statistics 240 sent by the edge switch 250. Based on the flow rate statistics 240, the scheduler 220 may generate a probabilistic routing table 230. Regarding the probabilistic routing table 230, for a unit of communication (e.g., a data unit such as a packet or frame) currently at a node or switch n and destined for destination d, the probabilistic routing table 230 may provide a probability for the communication to choose hop j as the next hop on its way to destination d. Thus, the probabilistic routing table 230 may contain multiple entries storing such probabilities for determining next hops.

In some implementations, the shadow system 210 may periodically or intermittently update the switch 250 with the probabilistic routing table 230. As a result, for a particular communication (e.g. a data unit such as a packet or frame) at the edge switch 250, the edge switch 250 may use the probabilistic routing table 230 in conjunction with the VLAN map 280 to determine a path, and a VLAN including the path, for that particular communication.

Thus, the interactions described with respect to FIG. 2 may occur periodically or intermittently to ensure the network 200 is updated with the latest information. For example, the edge switch 250 may periodically or intermittently update the shadow system 210 with flow rate statistics 250. The shadow system 210 may in turn periodically or intermittently update the edge switch 250 with any changes to the probabilistic routing table 230 based on the flow rate statistics 240.

The switch 250 also includes a VLAN map update module 290 to perform a VLAN map update technique (as described below), to update a VLAN set in response to changes in network conditions or other criteria.

Figure 3:
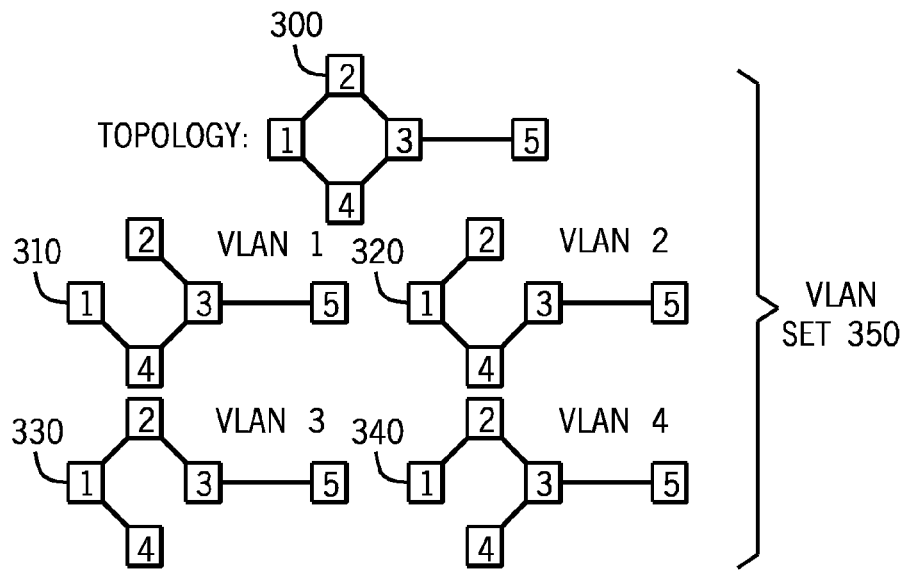
FIG. 3 is a schematic diagram of a network topology according to example implementations.
Figure 4:
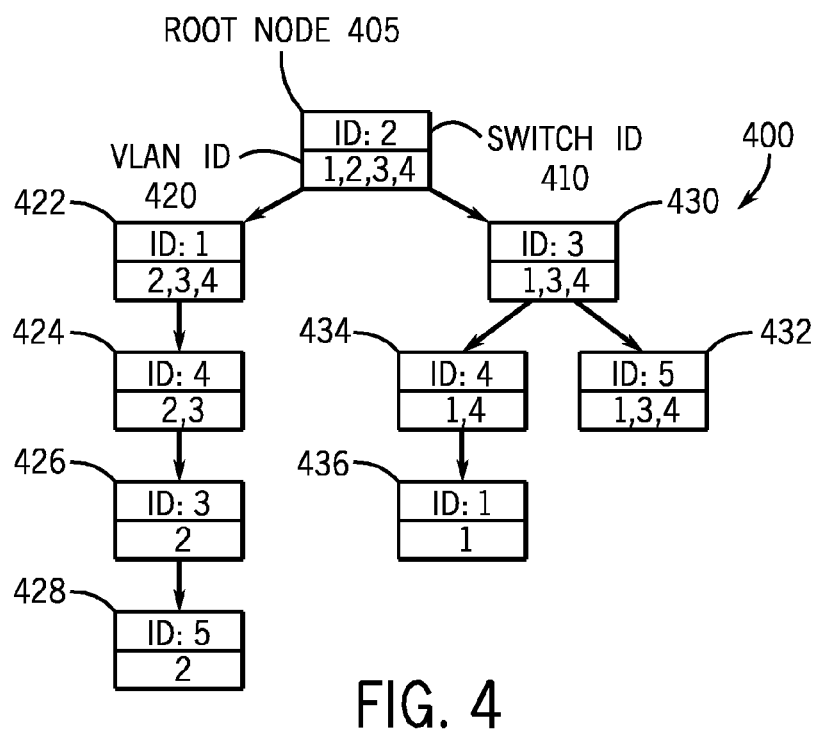
FIG. 4 is a schematic diagram of a VLAN map according to example implementations.

Turning now to FIG. 3 and FIG. 4, a VLAN set having multiple VLANs according to a particular network topology 300 may be illustrated in FIG. 3, and a VLAN map corresponding to the VLAN set in the network topology 300 may be illustrated in FIG. 4. As such, the descriptions of FIG. 3 and FIG. 4 are provided together.

According to the network topology 300 illustrated in FIG. 3, switches 1, 2, 3, and 4 may be arranged in a diamond pattern with switches 2 and 4 at the top and bottom edges, respectively, and switches 1 and 3 at the left and right edges, respectively. Switch 5 may be coupled to switch 3. It should be noted a different network topology with a different number of switches and different arrangement patterns are also possible.

Furthermore, VLAN 1 310, VLAN 2 320, VLAN 3 330, and VLAN 4 340 may be part of a VLAN set 350 for the network topology 300. These VLANs 310-340 may represent different possible paths among the switches in the network topology 300. In certain implementations, different VLANs 310-340 may include different combinations of paths. As illustrated in FIG. 3, though some paths may overlap between VLANs 310-340, i.e., some VLANs 310-340 may include the same path(s), no two VLANs 310-340 have the exact same combination of paths. In other implementations, different VLANs 310-340 may not have any overlapping paths. Furthermore, there may exist only one path between any pair of switches on every VLAN 310-340. Notably the paths in the VLANs 310-340 may be structured such that loops in the VLANs 310-340 are avoided.

FIG. 4 represents a VLAN map 400 corresponding to the network topology 300 and VLAN set 350 illustrated in FIG. 3. As illustrated in FIG. 4, the VLAN map 400 may be associated with switch 2 of the network topology 300 as well as the VLAN set 350. Consequently, switch 2 may be represented by the root node 405 for the VLAN map 400. The VLAN map 400 may include child nodes 422, 424, 426, 428, 430, 432, 434, and 436, which depend directly or indirectly from the root node 405. Moreover, each node in the VLAN map 400 may include a switch ID 410 (e.g. in root node 405) and one or multiple VLAN IDs 420 (e.g. in root node 405). For example, in the root node 405 associated with switch 2, the switch ID 410 may be 2 to correspond to switch 2.

In some implementations, each node may store VLAN IDs that represent VLANs having paths from a parent node switch to a child node switch. For example, consider the root node 405 representing switch 2. At the root node, all VLANs in the VLAN set are identified by the VLAN IDs 420 for the root node 405. Thus, the VLAN IDs 420 for the root node 405 may identify VLANs 1-4 310-340, respectively. Furthermore, according to the network topology 300, direct hops from switch 2 can be made to switch 1 and to switch 3. Thus, root node 405 may have two direct child nodes in child node 422 and child node 430, which represent switch 1 and switch 3, respectively, as illustrated in their respective switch IDs 410.

Furthermore, VLAN 2 320, VLAN 3 330 and VLAN 4 340 may include paths for making a direct hop from switch 2 to switch 1. Therefore, the VLAN ID 420 of child node 422 may include the numbers 2, 3, and 4 to represent the above VLANs. Similarly, the VLAN ID of child node 430 may include the numbers 1, 3, and 4 since VLAN 1 310, VLAN 3 330, and VLAN 4 340 may contain paths for a direct hop from switch 2 to switch 3.

In addition, a hop may be made from switch 3 to switch 4, which may be represented by VLAN 1 310 and VLAN 4 340. As such, child node 434 may include a switch ID of 4 while its VLAN IDs may include 1 and 4 but not 2 even though VLAN 2 320 may also include a direct hop from switch 3 to switch 4. VLAN 2 320 is not identified in the VLAN ID of the child node 434 because VLAN 2 does not include a direct hop from switch 2 to switch 3 in the first place. Consequently, a general rule of the VLAN map 400 may be that the VLAN IDs of a child node may be a subset of the VLAN IDs of its parent node. The VLAN map 400 may continue to branch out into more child nodes until all the paths and VLANs described by the VLAN set 350 are recorded.

While the VLAN map 400 may provide an effective way to store VLAN and path relationships, changing network traffic conditions may eventually render the VLAN set 350 (represented by the VLAN map 400) less efficient or non-optimal over time. For example, more efficient paths not included within the VLAN set 350 (represented by the VLAN map 400) may be discovered based on the flow-rate statistics 240 (depicted in FIG. 2). Thus, adapting the VLAN set 350 to changing network conditions may improve the ability to identify optimal paths in the network. Once the VLAN set 350 is adapted or updated, the VLAN map 400 may also be updated to reflect any changes in the VLAN set 350.

Figure 5:
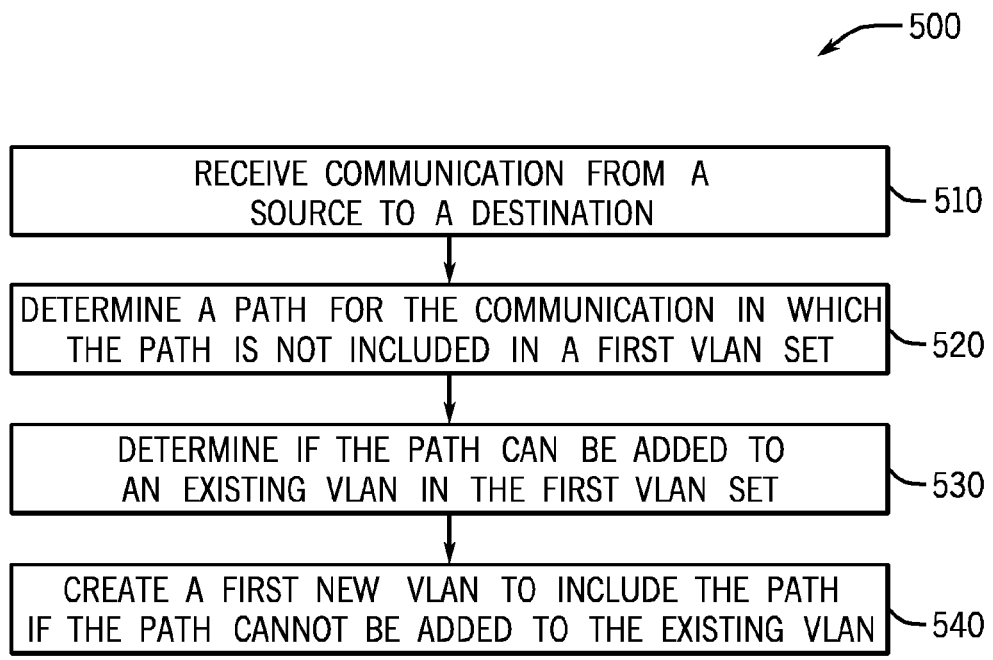
FIG. 5 is a flow diagram depicting a technique for updating a VLAN map according to example implementations.

FIG. 5 illustrates a flow diagram 500 depicting a method 500 (performed by the switch 250, for example) according to some implementations. The method 500 may provide a technique for updating a VLAN map (e.g., VLAN map 280) to reflect changes in a VLAN set (e.g., VLAN set 350) according to route and traffic calculations. In some instances, the method 500 may be said to provide an adaptive VLAN map updating technique.

The method may begin in block 510, where a switch 250 may receive a communication (e.g. a data unit such as a packet or frame) sent from a source to a particular destination. In block 520, the switch 250 may determine a path for the communication in which the path may not be included in a first VLAN set associated with the switch 250 (i.e., the path may not be included in the switch's 250 VLAN map 280). In some implementations, after receiving the communication, the switch 250 may perform a lookup of a probabilistic routing table 230 (calculated by the shadow system 210) in the switch 250. Thus, the probabilistic routing table 230 may identify a path for the communication that is not included within the first VLAN set.

In block 530, the VLAN map update module 290 of the switch 250 may determine if the path can be added to an existing VLAN from the first set of VLANs. Various criteria may be considered in making such a determination. For instance, the switch 250 may determine if the path can be added to an existing VLAN in the first VLAN set without creating a loop in the VLAN.

In block 540, if the VLAN map update module 290 of the switch 250 determines that the path cannot be added to an existing VLAN, a new VLAN may be created to include the path. The creation of the new VLAN may be performed by using VLANs of a second VLAN set. In some implementations, the second VLAN set may be a set of empty VLANs. Thus, once the switch 250 determines that the path cannot be added to an existing VLAN in the first VLAN set, the switch 250 may create the new VLAN by adding the path to one of the empty VLANs in the second VLAN set. The VLAN map 280 may be updated with the new VLAN, which effectively adds the new VLAN to the first VLAN set. For example, referring to FIG. 3, a new VLAN could be added to the VLAN set 350 with the conditions and examples provided.

FIG. 6 illustrates a method 600 (performed by the switch 250 of FIG. 2, for example) for updating a VLAN map according to other implementations. Like FIG. 5, the method 600 begins in block 610 when a communication may be received by a switch, such as switch 250 of FIG. 2. Additionally in block 610, the switch 250 may determine a path for the communication that is not included within a first VLAN set. While not illustrated in the flow diagram in FIG. 6, it should be understood that if the communication is on a path that is included within a VLAN in the first VLAN set, then the path in that VLAN may simply be used for the communication.

In block 620, the switch 250 may determine whether the path (that is not part of any VLAN in the first VLAN set) can be added to an existing VLAN in the first VLAN set. If so, then the existing VLAN may be updated by adding the path to the existing VLAN in block 630. If the path cannot be added to an existing VLAN, the switch 250 may determine whether there are any available empty VLANs in block 640. In some implementations, a controller such as the controller 110 illustrated in FIG. 1 may initially pre-allocate certain VLANs having certain paths. In addition, the controller 110 may also reserve a second set of empty VLANs. Thus, with respect to block 640, the switch 250 may check the second set of VLANs for any empty VLANs.

In block 650, if the switch 250 identifies an empty VLAN, a new VLAN is created from the empty VLAN by adding the path to the empty VLAN. If instead the switch 250 determines that there are no empty VLANs left, the switch 250 may identify a least optimal existing VLAN from the VLAN set in step 660. To this end, various factors may be considered to determine the quality of a VLAN. In some implementations, the switch 250 may consider how often a VLAN is used, how heavily the VLAN is being used, and/or how many paths in the VLAN have been used. For example, the least recently used VLAN in the VLAN set may be considered the lowest quality VLAN of the VLAN set.

In block 670, after identifying the lowest quality VLAN, the lowest quality VLAN may be emptied (e.g. the paths in this VLAN are deleted or removed). Subsequently, a new VLAN may be created from the emptied VLAN by adding the path to the emptied VLAN. In addition, in some implementations, the quality of a VLAN may be referred to as the VLAN's goodness. Moreover, while not illustrated in the flow diagram depicted in FIG. 6, any time a new VLAN is created, such as in blocks 630, 650, and 670, a VLAN map 280 associated with the switch 250 may be updated to reflect the new VLAN.

Instructions of modules described above (including modules for performing tasks of FIG. 5 or FIG. 6) are loaded for execution on a processor (such as one or more processors 115 in FIG. 1 and one or multiple processors 260 in FIG. 2). A processor can include a microprocessor, microcontroller, processor module or subsystem, programmable integrated circuit, programmable gate array, or another control or computing device.

Data and instructions are stored in respective storage devices, which are implemented as one or more computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:
1. A method, comprising:
receiving, at a switch, a communication from a source to a destination;
determining a path for the communication, wherein the path is not included in a first set of virtual networks associated with the switch;
determining if the path can be added to an existing virtual network from the first set of virtual networks; and
creating a first new virtual network to include the path if the path cannot be added to the existing virtual network.

2. The method of claim 1, wherein creating the first new virtual network comprises:
   identifying an empty virtual network in a second set of virtual networks; and
   creating the first new virtual network from the empty virtual network.

3. The method of claim 1, wherein in response to determining that the path can be added to the existing virtual network, creating a second new virtual network by adding the path to the existing virtual network.

4. The method of claim 1, wherein the first virtual network is a virtual local area network.

5. The method of claim 1, wherein in response to determining that the path cannot be added to the existing virtual network, determining if there are any available empty virtual networks in a second set of virtual networks.

6. The method of claim 5, wherein in response to determining that there are no available empty virtual networks in the second set of virtual networks:
   identifying a lowest quality virtual network from the first set of virtual networks; and
   emptying the lowest quality virtual network.

7. The method of claim 6, wherein identifying the lowest quality virtual network comprises determining a least recently used virtual network.

8. The method of claim 1, wherein determining if the path can be added to the existing virtual network comprises determining if the path can be added to the existing virtual network without creating a loop in the existing virtual network, and wherein the first new virtual network is created in response to determining that adding the path to the existing virtual network would create the loop.

9. The method of claim 1, wherein the path is constructed from a probabilistic routing table of a shadow system and a virtual network map.

10. A switch, comprising:
    a processor; and
    a memory to store instructions, which when executed by the processor, cause the processor to:
      receive a communication from a source to a destination;
      determine that a path for the communication, is not included in a first set of virtual networks associated with the switch;
      determine if the path can be added to an existing virtual network from the first set of virtual networks; and
      create a first new virtual network to include the path in response to determining that the path cannot be added to the existing virtual network.

11. The system of claim 10, wherein the instructions to create the first new virtual network comprise instructions to:
    identify an empty virtual network in a second set of virtual networks; and
    create the first new virtual network from the empty virtual network.

12. The system of claim 10, wherein in response to determining that the path can be added to the existing virtual network, the instructions further cause the processor to create a second new virtual network by adding the path to the existing virtual network.

13. The system of claim 10, wherein in response to determining that the path cannot be added to the existing virtual network, the instructions further cause the processor to determine if there are any available empty virtual networks in a second set of virtual networks.

14. The system of claim 13, wherein in response to determining that there are no available empty virtual networks in the second set of empty virtual networks, the instructions further cause the processor to:
    identify a lowest quality virtual network from the first set of virtual networks; and
    empty the lowest quality virtual network.

15. The system of claim 14, wherein the instructions to identify the lowest quality virtual network comprise instructions to determine the least recently used virtual network.

16. A non-transitory computer readable medium to store instructions, which when executed by a processor, cause a switch to:
    determine that a path for a received communication according to a routing table is not included within a first set of virtual networks associated with the switch;
    determine if the path can be added to an existing virtual network from the first set of virtual networks; and
    create a first new virtual network to include the path in response to determining that the path cannot be added to the existing virtual network.

17. The computer readable medium of claim 16, wherein the routing table is received at the switch from a controller having a scheduler to generate the routing table.

18. The computer readable medium of claim 17, wherein the instructions when executed cause the switch to further send flow-rate statistics to the scheduler to update the routing table.

19. The computer readable medium of claim 16, wherein the first set of virtual networks is represented by a virtual network map.

20. The computer readable medium of claim 19, wherein the instructions further cause the switch to update the virtual network map with the created first new virtual network.

* * * * *